(No Model.)
M. G. WILDER.
GROUP GOVERNOR.
No. 486,574. Patented Nov. 22, 1892.
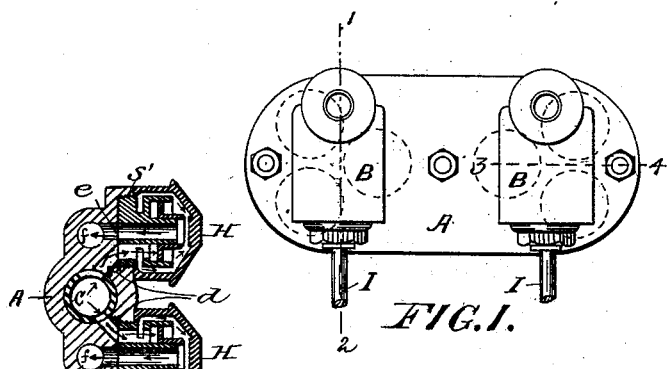
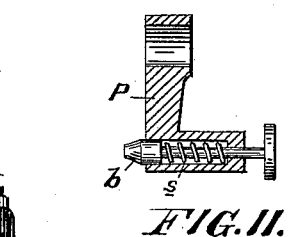
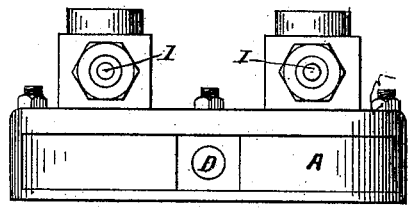
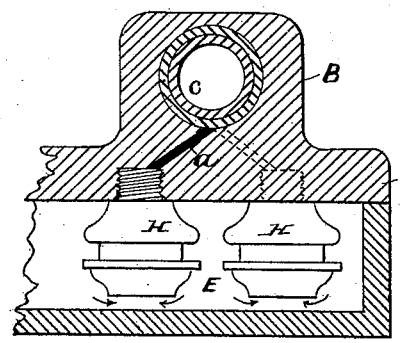
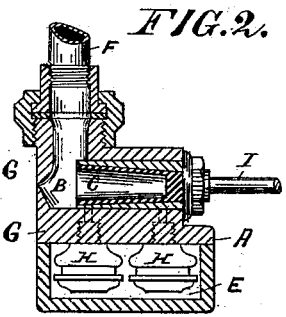
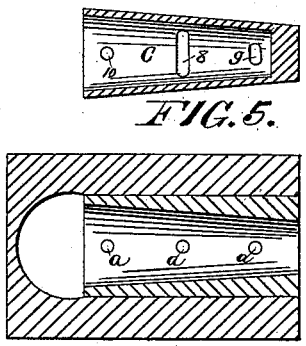
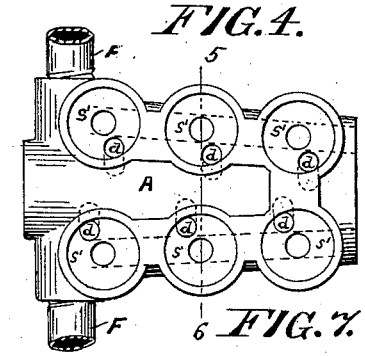
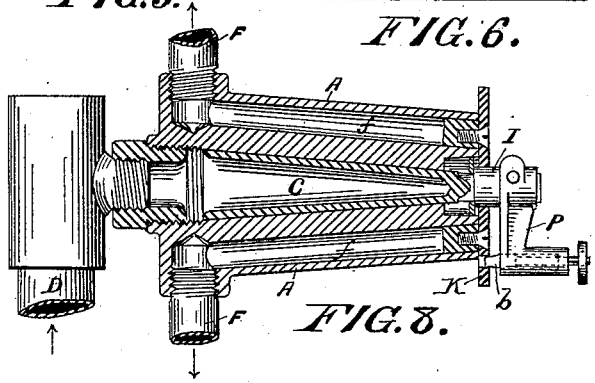
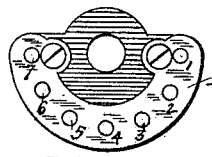
WITNESSES:
Mary J. Knox
Geo. B. Clover
INVENTOR
Moses G. Wilder
by his attorney
Chas. A. Rutter

UNITED STATES PATENT OFFICE.

MOSES G. WILDER, OF PHILADELPHIA, PENNSYLVANIA.

GROUP-GOVERNOR.

SPECIFICATION forming part of Letters Patent No. 486,574, dated November 22, 1892.

Application filed November 25, 1891. Serial No. 413,073. (No model.)

*To all whom it may concern:*

Be it known that I, MOSES G. WILDER, a citizen of the United States, and a resident of the city and county of Philadelphia, and State of Pennsylvania, have invented a new and useful Group-Governor, of which the following is a specification.

The object of my invention is to furnish a means for controlling and regulating the supply of gas to a gas-oven, heating-stove, or similar apparatus, by means of which it will be possible to adjust the gas-supply proportionately to the work and to do this more certainly than has been possible heretofore.

My invention is further intended to insure a constant and fixed supply of gas, notwithstanding alterations in its initial pressure, and to enable the user to determine the rate of supply by means of an index and stop, the position of the latter of which would show how many governors were supplying gas and as each governor passes a fixed amount of gas in a given time the amount of gas that was being supplied.

My improvement is a new form of volumetric regulator or governor, which consists, usually, of a suitable body in or on which are mounted a group of two or more volumetric regulators or governors of a suitable form, these governors being combined with gasways and a cock, valve, or equivalent device by means of which the gas-passages leading to or from said volumetric regulators and conveying gas may be opened or closed, the whole combined and operating so that the regulators may be brought progressively into action to increase the supply or out of action to decrease it, as the particular apparatus may require to which the regulator may be applied.

At present the method of regulating gas-burners is limited to the use of a governor for one or more burners, and volumetric governors have been made adjustable for the quantity of gas required. Thus if a burner or group of burners required twenty feet of gas per hour a governor was selected which could be adjusted to pass twenty feet. The adjustment could be usually varied somewhat, and when used upon some gases the twenty-foot governor would be set to pass eighteen feet, perhaps, because the gas would be so rich in carbon that the flame would be as large as would be desirable with that quantity, while the same governor when used on a poorer gas would be set to pass more than twenty feet, because the flame would look better with a little more gas; but when once set for any particular gas no change in the adjustment would be made, and the sole function of the governor was then to maintain a constant flow of this quantity automatically.

By my present invention I have added a new and useful function to the governor, whereby I can not only control the maximum flow to a burner or group of burners, but I can also subdivide this maximum amount into such parts as I choose and can control fully each of these subdivisions, also. Previously if a flame less than the maximum was required and the gas-cock was opened a little way, so that only a small quantity would flow through the cock to the burner, the governor did not act at all, because its action depends upon the flow through it of that quantity for which it may be set. Any less quantity than this maximum would therefore be entirely uncontrolled and would increase or decrease with any variation of the pressure in the supply. It has been, therefore, impossible to regulate the heat of an oven or stove satisfactorily by such a method. By my present invention I can divide up the full quantity into parts, and by grouping small governors so that the gas from them passes into gasways common to two or more of such governors the control and regulation of the heating power of the oven or other apparatus is rendered more satisfactory and convenient than before. Each small governor is capable of an adjustment for more or less gas, also. I can therefore subdivide the total quantity required by the oven or other apparatus into different increments. Thus, for instance, if an oven require for each of two burners twenty feet of gas per hour I can attach to the oven a single group of five small governors, each being capable of passing and regulating eight feet of gas per hour. By admitting gas to these governors progressively I have a heating effect, then, varied in the ratio of eight to sixteen to twenty-four to thirty-two to forty feet; or I can attach two groups of five small governors and separate the two burners, so that each acts alone. Now my heating effect can be varied as four to eight to twelve to sixteen to twenty to twenty-four to twenty-eight to thirty-two to thirty-six to forty if my governors are all set alike; but I can also alter the adjustment of the governors as I may choose, and thus vary this ratio at pleasure. It will be seen that there are a great many ways in which this method of regulation by subdivision can be applied, and while I prefer to make each group-governor complete in itself, having in each one the group of governors mounted in or upon a suitable metal body containing a cock or valve and the necessary gasways to convey the gas to and from the governors, I am not desirous of limiting myself to such a construction, as the benefit of my invention can be secured whenever two or more governors are grouped about a gasway common to them, so that they can be brought progressively into action, as described. Neither do I wish to limit myself to the use of my invention for the purpose of controlling the flow of gas to burners, as it would be useful and valuable also in controlling the flow of gas in stated quantities to any other apparatus where this form of regulation is desired.

In the accompanying drawings, forming part of this specification, and in which similar letters of reference indicate similar parts throughout the several views, Figure 1 is a plan of case for holding the volumetric regulators; Fig. 2, a side elevation of Fig. 1; Fig. 3, a sectional elevation of Fig. 1 on line 1 2; Fig. 4, an enlarged sectional elevation of Fig. 1 on line 3 4; Fig. 5, a sectional plan of plug, Fig. 3; Fig. 6, a sectional plan of plug-cock seat; Fig. 7, a plan of a modification of my invention adapted to hold the regulators on its outside. Fig. 8 is a section of the device shown in Fig. 7, taken on a line passing centrally through the gasways and cock; Fig. 9, a section of Fig. 7 on line 5 6, showing two down-current regulators in sectional elevation; Fig. 10, a front elevation of indicator-plate, Fig. 8, showing detents; and Fig. 11, an enlarged sectional elevation through center of governor-operating handle, showing point or stop for engaging with detents in indicator.

A, Figs. 1, 2, 3, and 4, is a case which contains a chamber or chambers B. C is a plug-cock within this chamber. D, Fig. 2, is the gas-inlet to a lower chamber E. F are pipes which lead from each group of governors and chambers B to the burners. A partition G separates the upper and lower chambers, and screwed into this partition are the volumetric regulators H, which may be similar to those for which I obtained a patent on February 12, 1889, No. 397,573, or of any other suitable form.

Gas-passages $a$, Figs. 4 and 6, are drilled in the partition G, communicating with the regulators and with suitable orifices in the plug C. I is a stem connected to plug C. Upon the outside end of this stem is an operating handle or lever P, Figs. 8 and 11, by means of which this stem and the plug C may be turned to admit or shut off the supply of gas to the burner. A spring-stop upon the handle P (best shown in Fig. 11) fixes this handle in any desired position. This stop has a point $b$, which is pushed outward by a spring $s$ and enters a hole drilled in a plate K, Figs. 8 and 10, as shown at 1 2 3 4, &c., Fig. 10. The plug C is furnished with orifices 8 9 10, so placed as to admit the gas from one regulator to the interior of the plug, or from more than one, as may desired. In Figs. 1, 2, 3, and 4 but three regulators are shown in one group. Consequently the indicator-plate K in this case would only need four detents 1 2 3 4, one for each regulator and one for the spring-stop when all the regulators are out of use. We will suppose the handle P to be turned to the right and all the regulators out of use. If now the handle is turned to the left so that the spring-stop engages the second detent, the gas is passing through one regulator to the plug and thence to the burner. If the handle is drawn down to detent 3, the gas from two regulators is passing to the burner, and so on. The regulators being adjusted to pass, say, four feet of gas each per hour and no more, a glance at the position of the handles will show exactly how much gas is being consumed by the burner at any time.

For purposes of description and illustration I have shown the gas-passages in partition G, which lead from the regulators to the plug C, terminating in a straight line directly under the longitudinal axis of the plug-cock. The holes 8, 9, and 10 in the plug are so arranged that when handle P is brought to detent 2 on the indicator the gas will flow from one regulator to the interior of the plug through hole 8 in the plug. When the handle is brought to detent 3, the gas will flow from two regulators to the interior of the plug through holes 8 and 9 in the plug, and when brought to hole 4 it will flow through holes 8, 9, and 10 in the plug from three regulators.

In Figs. 7, 8, and 9 a modification of my invention is shown, in which the gas first enters the plug, passes from there through suitable orifices in the same similar to those already described for the plug and shown in Fig. 5 to orifices $d$ in the case A, thence into the governors H, which are placed in the seats $s'$ in the case, thence down through orifices $e$ in the case to gasways $f$, and thence through pipes F to the burners. The direction of the gas in its passage through the governors H is shown by the arrows, these governors being of the kind known as "down-current" governors.

As I have stated before, any of the well-known forms of volumetric governors may be used, and they may be arranged in groups of two or more, as the particular requirements of any case may demand, and while I have shown them combined with a hollow-plug cock in the drawings it will be understood that I do not desire to confine myself to this form of cock exclusively, as other forms of cocks or valves may be arranged to accomplish my purpose—viz., the bringing of the several governors of a group of governors into action progressively, so as to increase or decrease the supply of gas in stated quantities.

I claim—

1. The combination of two or more volumetric regulators, a shell or case supporting said regulators, gas-passages in said shell, and a valve or cock carried by said case and constructed to open or close said gas-passages progressively.

2. The combination of two or more volumetric regulators, a shell or case supporting said regulators, a cock or valve carried by said case, gas-passages in said shell or case connecting said cock and regulators, and gas-passages in said cock adapted to control the supply of gas to or from said regulators progressively.

3. The combination, with a group of volumetric regulators, the case which supports them, and the valve or cock by means of which the supply of gas to or from said regulators is controlled, of a crank or arm for turning said valve or cock and a stationary index to show by the position of said crank the number of regulators through which gas is passing.

MOSES G. WILDER.

Witnesses:
MORRIS R. BOCKIUS,
CHAS. A. RUTTER.